(12) United States Patent
Guo et al.

(10) Patent No.: US 9,736,771 B2
(45) Date of Patent: Aug. 15, 2017

(54) ENERGY EFFICIENT MANAGEMENT OF HETEROGENEOUS MULTI-HOP WIRELESS NETWORKS

(71) Applicant: Mitsubishi Electric Research Laboratories, Inc., Cambridge, MA (US)

(72) Inventors: Jianlin Guo, Newton, MA (US); Kaikai Liu, Gainesville, FL (US); Philip Orlik, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 115 days.

(21) Appl. No.: 14/600,387

(22) Filed: Jan. 20, 2015

(65) Prior Publication Data

US 2016/0212698 A1    Jul. 21, 2016

(51) Int. Cl.
*H04W 52/02* (2009.01)
*H04L 12/733* (2013.01)
(Continued)

(52) U.S. Cl.
CPC .......... *H04W 52/0203* (2013.01); *H04B 7/14* (2013.01); *H04L 45/20* (2013.01); *H04W 28/0221* (2013.01); *H04W 40/10* (2013.01); *H04W 52/0216* (2013.01); *H04W 52/0229* (2013.01); *H04W 52/0261* (2013.01); *Y02B 60/50* (2013.01)

(58) Field of Classification Search
CPC ......... H04W 52/0203; H04W 28/0221; H04W 52/0216; H04W 52/0229; H04W 52/0261; H04W 40/10; H04L 45/20; H04B 7/14; Y02B 60/50
See application file for complete search history.

(56) References Cited

U.S. PATENT DOCUMENTS 7,298,716 B2    11/2007    Abraham et al.
7,356,561 B2    4/2008    Balachandran et al.
(Continued)

OTHER PUBLICATIONS

Liu, et al., "Battery Energy Management in Heterogeneous Wireless Machine-to-Machine Networks", Sep. 6-9, 2015, Vehicular Technology conference (VTC Fall), 2015 IEEE 82nd.*

*Primary Examiner* — Noel Beharry
*Assistant Examiner* — Ruihua Zhang
(74) *Attorney, Agent, or Firm* — Gene Vinokur; James McAleenan; Hironori Tsukamoto

(57) ABSTRACT

A wireless multi-hope network of nodes including data nodes and at least one sink node. The data nodes include battery-powered nodes (BPNs) having active and sleep periods and mains-powered nodes (MPNs) having only active periods, wherein each data node transmits the packets only within corresponding active periods. A BPN includes a transceiver for transmitting and receiving data packets and a processor for determining a schedule of active and sleep periods of the BPN independently from the active and sleep periods of other data nodes in the network and independently from commands transmitted by the sink node, and a battery for providing energy to the transceiver and the processor. The processor switches the transceiver ON and OFF according to the schedule.

16 Claims, 9 Drawing Sheets

(51) Int. Cl.
*H04B 7/14* (2006.01)
*H04W 28/02* (2009.01)
*H04W 40/10* (2009.01)

(56) References Cited

U.S. PATENT DOCUMENTS

2012/0113863 A1\* 5/2012 Vasseur .................. H04L 12/12
370/254
2013/0121178 A1\* 5/2013 Mainaud ............... H04W 40/12
370/252

\* cited by examiner

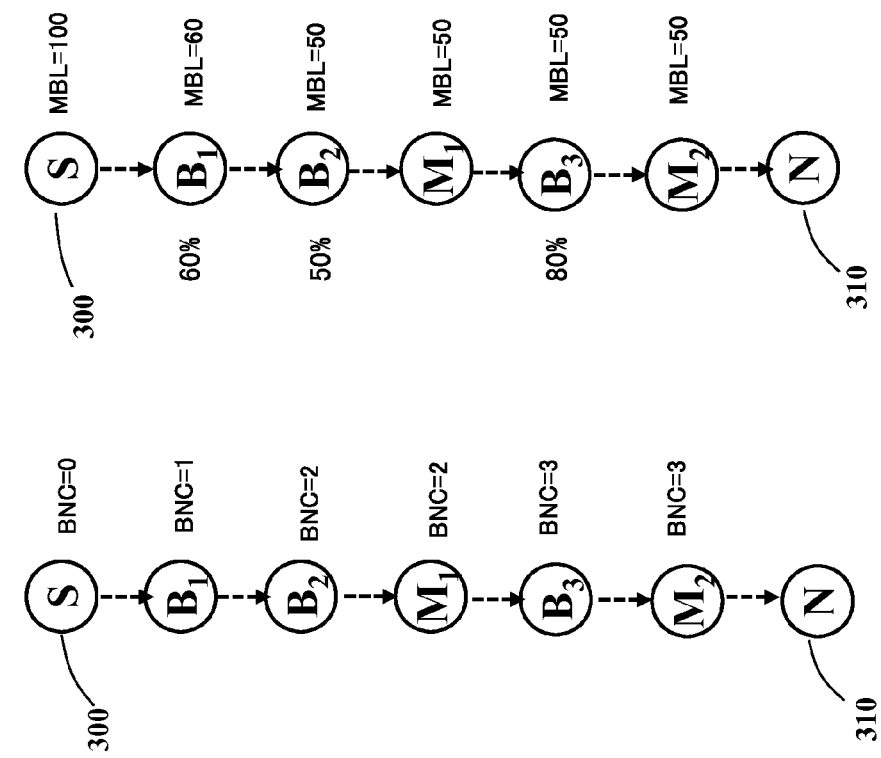
Fig. 4C
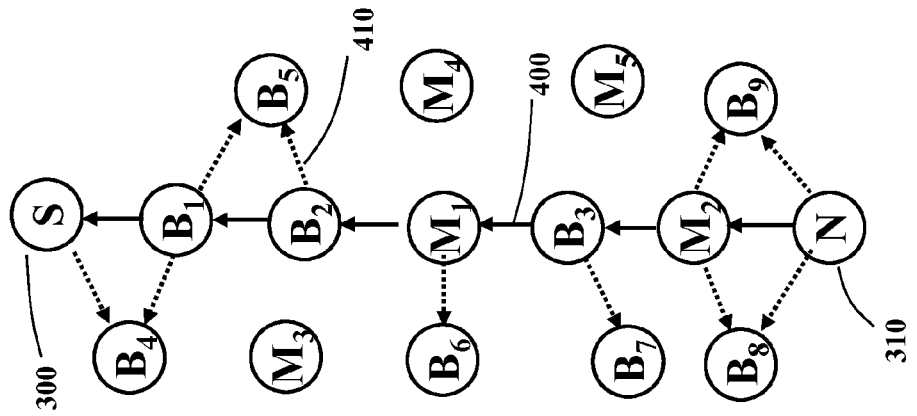
Fig. 4B
Fig. 4A

ENERGY EFFICIENT MANAGEMENT OF HETEROGENEOUS MULTI-HOP WIRELESS NETWORKS

FIELD OF THE INVENTION

This invention relates generally to management of wireless networks, and particularly to management of heterogeneous multi-hop wireless networks including battery-powered nodes and mains-powered nodes.

BACKGROUND OF THE INVENTION

Energy efficient management, such as routing of data packets, is a critical issue for networks including nodes with constrained power source. According to the power source of the node, the nodes can be classified into two categories, i.e., nodes with constrained power source such as battery-powered nodes (BPNs) and nodes with un-constrained power source such as mains-powered nodes (MPNs). In some applications, battery replacement is impractical or impossible. Therefore, in wireless networks including the BPNs, prolonging network lifetime becomes critical. The network lifetime is generally defined by the operation time of the battery powered node that first runs out of battery power.

Based on resource and capability of the node, the wireless networks can be classified into homogeneous and heterogeneous. In a homogeneous wireless network, all nodes have identical resources and capabilities. All nodes are either battery powered, or mains powered. A wireless sensor network is an example of homogeneous wireless network in which all nodes are typically battery powered. Electric smart meter network is another example of homogeneous wireless network in which all nodes are mains powered. On the other hand, in a heterogeneous wireless network, nodes have different resources and capabilities, e.g., some nodes can be battery powered and have small memory and limited computational capabilities, and other nodes can be mains powered and have greater memory and computational capabilities.

In a wireless network with battery powered nodes, a key objective of network management, such as routing, is to maximize the network lifetime. A node consumes its energy for data transmission, data receiving, control message transmission and control message receiving. This category of energy consumption is considered as necessary energy use. A node also consumes its energy on idle listening, overhearing, collision and retransmission. This category of energy consumption is considered as energy waste. One of the main goals for the energy saving management is to minimize the energy waste.

However, the energy related management methods designed for homogeneous wireless network do not work well for heterogeneous wireless networks. For example, the routing methods designed for homogeneous networks do not consider and leverage heterogeneity. In addition, some methods reduce the energy consumption of the homogeneous network by synchronizing operations of the nodes of the network. See, e.g., U.S. Pat. No. 7,298,716 and U.S. Pat. No. 7,356,561 describing methods that use centralized sleep control mechanism in which a node can only sleep during a pre-specified time period. However, the synchronization of the network can reduce the collision of the data packets, but also can increase idle time resulting in additional energy waste. In addition, synchronization packet transmission and receiving also result in extra energy waste.

Accordingly, there is a need to provide a system and a method for energy efficient management of heterogeneous multi-hop wireless networks including battery-powered nodes and mains-powered nodes.

SUMMARY OF THE INVENTION

It is an object of various embodiments of the invention to provide a system and a method for energy efficient management of heterogeneous multi-hop wireless networks having at least one sink node and data nodes including battery-powered nodes (BPNs) and mains-powered nodes (MPNs). It is another object of some embodiments to provide an energy efficient routing mechanism for transmitting packets in a multi-hop manner in which at least one data node exchanging the packets with the sink node through at least one intermediate data node relaying the packets between the data node and the sink node. Additionally or alternatively, it is an object of some embodiments of the invention to provide a distributed sleep control model for such a heterogeneous wireless network that does not require synchronization of the operations of the nodes.

Some embodiments of the invention are based on recognition that centralized management is more advantageous for a homogeneous network than a heterogeneous network. This is because the synchronization of the network results in energy waste. For example, a centralized sleep control method can reduce the collision of data packets transmission, but also can increase idle time of the nodes, especially in situations when data transmission using mains-powered nodes is preferred.

Accordingly, some embodiments of the invention provide a distributed sleep management model to manage sleep schedules of the data nodes of the heterogeneous network. For example, in one embodiment, the MPNs have only active periods, i.e., the nodes do not have sleep periods. In contrast, the BPNs have both the active and sleep periods, but determine a schedule of the active and sleep periods independently from the active and sleep periods of other data nodes in the network or commands transmitted by the sink node. For example, in some embodiments, the processor of the BPN determines the schedule based on information internal to the BPN using activities of the network sensed by the BPN. In combination with always active MPNs and energy efficient routing, this distributed sleep management model increases sleep time of the BPNs.

Additionally or alternatively, some embodiments are based on a realization that the battery efficient routing of the data packets from a particular data node to the sink node should be via the routing path consuming the least battery energy. For example, some embodiments transmit the data packets along a routing path reducing a number of battery-powered nodes transmitting or receiving transmitted data packets. Optionally, one embodiment determines an energy saving metric to locate an energy efficient routing path. The energy saving metric can include one or combination of a power source (PS) metric identifying whether a data node is the BPN or the MPN, a battery-powered node count (BNC) metric storing a number of the BPNs along a routing path, a minimum battery level (MBL) metric storing a minimum level among the BPNs along the routing path, and a battery-powered overhearing count (BOC) metric storing a number of times that BPNs of the network receive and/or overhear the data packets transmitted on the routing path.

Accordingly, one embodiment of the invention discloses a network of nodes including data nodes and at least one sink node, wherein the network is a wireless multi-hope network in which packets are exchanged between the sink node and the data nodes in a multi-hop manner such that there is at least one data node exchanging the packets with the sink node through at least one intermediate data node relaying the packets between the data node and the sink node, the data nodes include battery-powered nodes (BPNs) having active and sleep periods and mains-powered nodes (MPNs) having only active periods, wherein each data node transmits the packets only within corresponding active periods.

A BPN includes a transceiver for transmitting and receiving data packets; a processor for determining a schedule of active and sleep periods of the BPN independently from the active and sleep periods of other data nodes in the network and independently from commands transmitted by the sink node, wherein the processor switches the transceiver ON and OFF according to the schedule; and a battery for providing energy to the transceiver and the processor.

Another embodiment discloses a battery-powered node (BPN) for forming a heterogeneous wireless multi-hope network of nodes including data nodes and at least one sink node, wherein the data nodes include battery-powered nodes (BPNs) and mains-powered nodes (MPNs). The BPN includes a transceiver for transmitting and receiving data packets; a processor for determining a schedule of active and sleep periods of the BPN independently from the active and sleep periods of other data nodes in the network and independently from commands transmitted by the sink node, wherein the processor switches the transceiver ON and OFF according to the schedule; and a battery for providing energy to the transceiver and the processor.

Yet another embodiment discloses a method for managing a battery-powered node (BPN) forming a heterogeneous wireless multi-hope network of nodes including data nodes and at least one sink node, wherein the data nodes include battery-powered nodes (BPNs) and mains-powered nodes (MPNs). The method includes determining a schedule of active and sleep periods of the BPN independently from the active and sleep periods of other data nodes in the network and independently from commands transmitted by the sink node; switching a transceiver of the BPN ON and OFF according to the schedule; transmitting a wakeup signal at the beginning of each active period; determining a routing path from the BPN to the sink node reducing a number of the BPNs transmitting or overhearing data packets transmitted on the routing path; and transmitting the data packets to a parent node starting the routing path during the active period.

BRIEF DESCRIPTION OF THE DRAWINGS

FIG. 4A illustrates how to count battery powered nodes along a routing path according to some embodiments of an invention;

FIG. 4B illustrates how to measure the minimum battery level along a routing path according to some embodiments of an invention;

FIG. 4C shows an example of battery powered neighbors overhear packet transmission along a routing path according to some embodiments of an invention;

DETAILED DESCRIPTION OF THE PREFERRED EMBODIMENTS

Figure 1A:
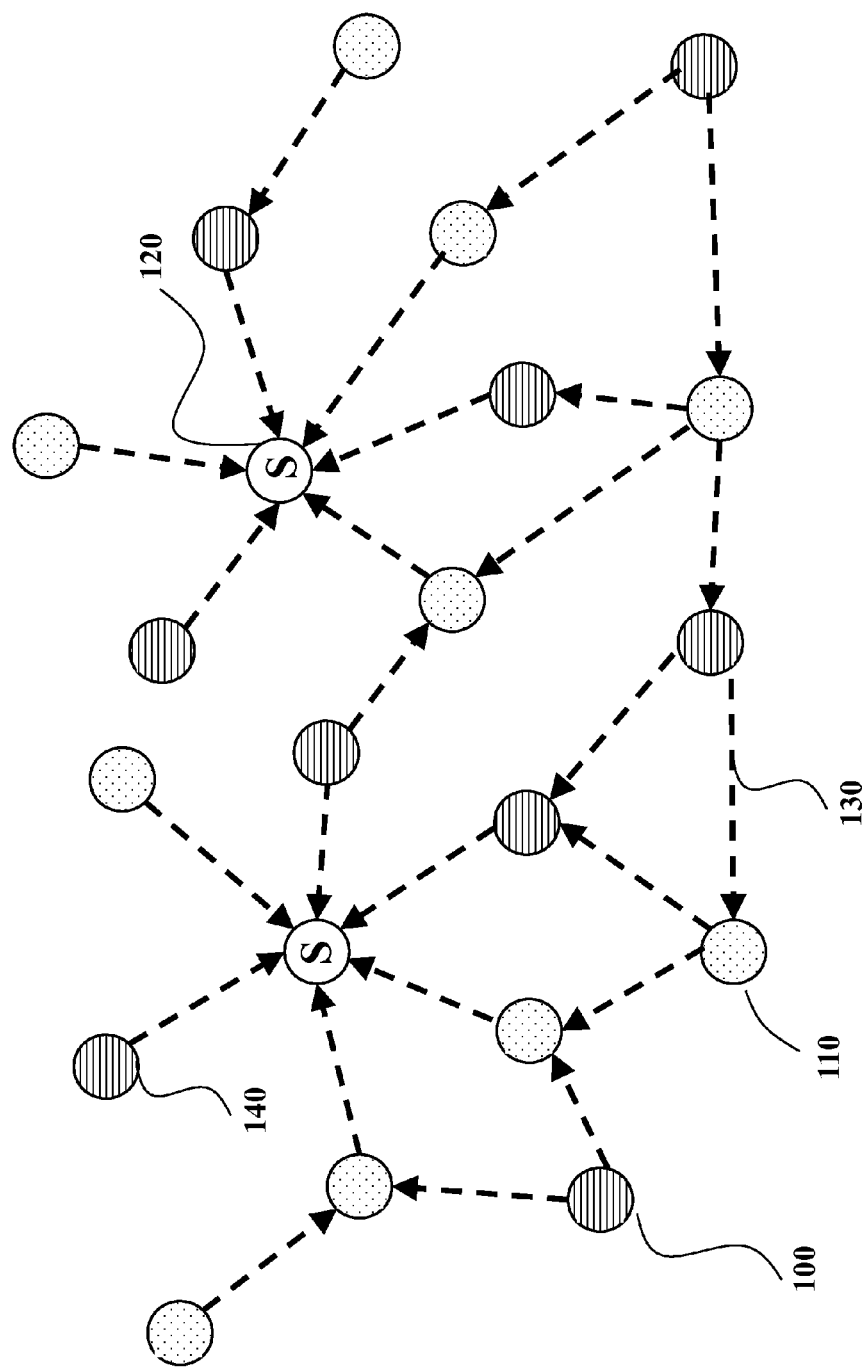
FIG. 1A is schematic of a heterogeneous wireless network according to some embodiments of an invention.

FIG. 1A shows a schematic of an example of heterogeneous wireless network that uses embodiments of the inventions. The network includes data nodes such as battery powered nodes (BPNs) 100 and mains powered nodes (MPNs) 110. The network also includes sink nodes (S) 120. The nodes form a wireless mesh network using directed wireless links 130, where the general flow of data packets is from the data nodes (battery powered nodes or mains powered nodes) to sink nodes, although control messages can be sent in either direction.

The network is a wireless multi-hop network in which packets are exchanged between the sink node and the data nodes in a multi-hop manner such that there is at least one data node exchanging the packets with the sink node through at least one intermediate data node relaying the packets between the data node and the sink node. For example, some nodes, e.g., 140, can transmit data packets directly to a sink node. Some of nodes, e.g., 100 and 110, cannot directly transmit data packets to any sink node. Instead, the data packets are first transmitted to intermediate or relay nodes, which then relay the packets to sink nodes. In other words, data collection is conducted in a multi-hop manner. Hence, a routing algorithm must be provided to route data packets from nodes that cannot directly communicate with any sink nodes.

Figure 1B:
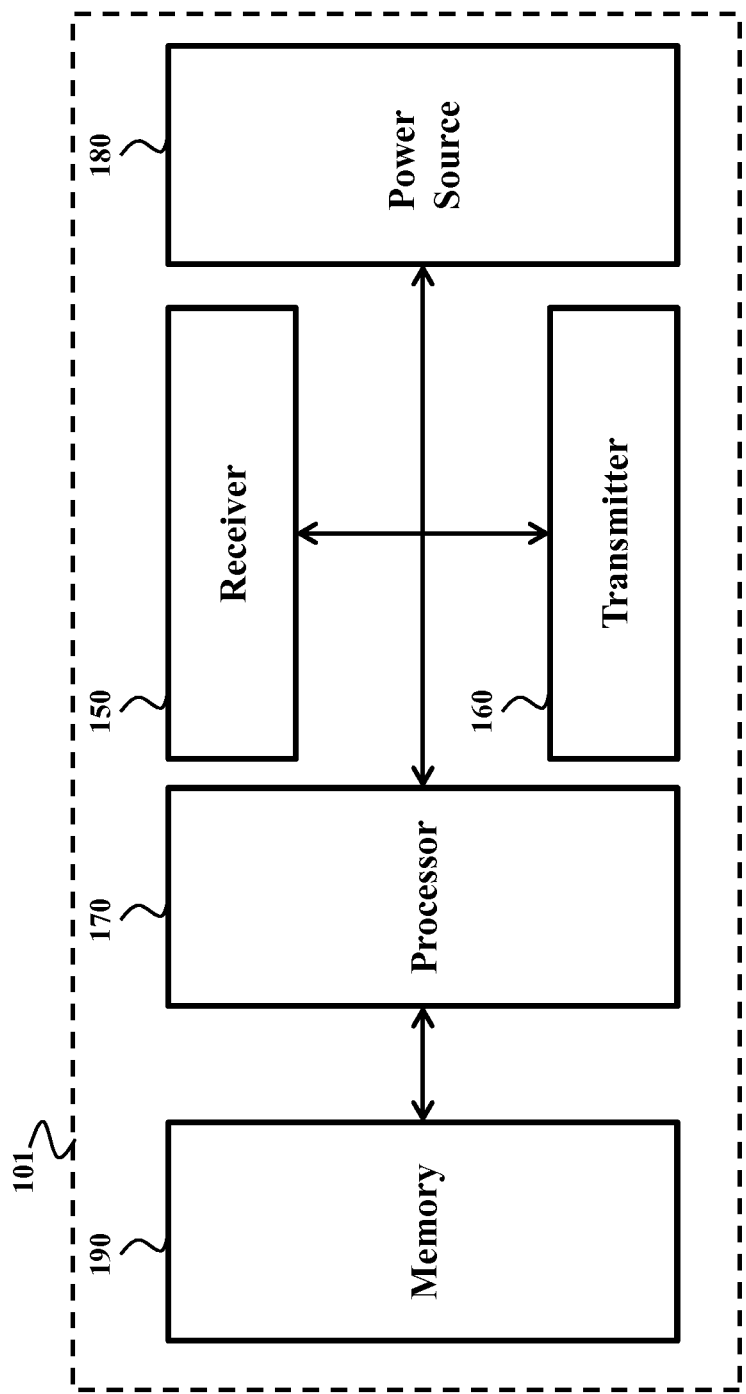
FIG. 1B is a block diagram of a structure of a data node in the network of FIG. 1A.

FIG. 1B shows schematically a structure of the data node 101 forming the network of FIG. 1. The node includes a transceiver for transmitting and receiving data packets, which includes one or combination of a receiver 150 and a transmitter 160. The node also includes a power source 180 for powering components of the node. According to a type of the power source 180, the nodes can be classified into two categories, i.e., the BPNs have constrained power source such as a battery and MPNs have un-constrained power source, e.g., powered from a main or a grid. In some embodiments, there is no restriction on power source of the sink nodes, which can either be mains powered or battery powered.

The data node 101 includes a processor 170 for performing operations of the node and/or for determining a schedule of active and sleep periods of the node. Each data node transmits the packets only during corresponding active periods.

According to some embodiments, the BPNs have active and sleep periods and MPNs have only active periods. If the data node 101 is a BPN, i.e., the power source 180 is a battery, then the processor determines the schedule of active and sleep periods of the BPN and switches the transceiver ON and OFF according to the schedule.

Distributed Sleep Management Model

Some embodiments of the invention are based on recognition that the centralized management is more advantageous for homogeneous rather than heterogeneous network. This is because the synchronization of the network results in energy waste. For example, a centralized sleep control method can reduce the collision of data packets transmission, but also can increase idle time of the nodes, especially in situations when data transmission over mains-powered nodes is preferred.

In various embodiments of the invention, the processor of the BPN determines the schedule independently from the active and sleep periods of other data nodes in the network and independently from any commands transmitted by the sink node. For example, the processor of the BPN determines the schedule based on information internal to the BPN using activities of the network observed by the BPN. For example, the data node 101 includes a memory 190 for buffering the data packets to be transmitted to the sink node. In one embodiment, the processor determines the schedule based on a number of the data packets in the memory, e.g., the active or sleep period is proportional to the number of the data packets in the memory.

Figure 2A:
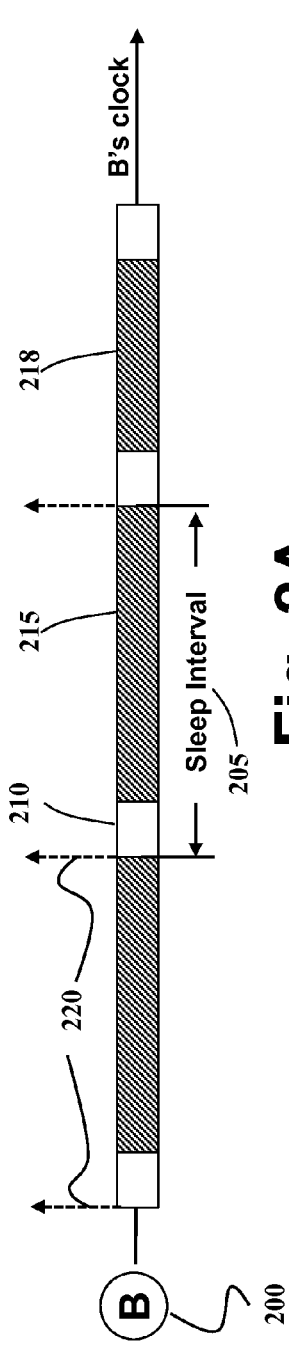
FIG. 2A shows schematic of a battery powered node's sleep interval configuration according to some embodiments of an invention.

FIG. 2A shows a schematic of the distributed sleep management model according to some embodiments of the invention. In these embodiments, a BPN 200 manages its own schedule of active and sleeps intervals. Time is partitioned into sleep intervals with different lengths. An interval 205 includes an active period 210 followed by a sleep period 215. The order of active and sleep periods varies for different embodiments. When BPN 200 goes to sleep, its transceiver is turned OFF. When the BPN 200 wakes up from the sleep, its transceiver is turned ON, and the BPN transmits a wakeup message 220 to inform neighboring data nodes that the BPN 200 is active. If the neighboring nodes have data packets to be sent to the BPN 200, then the neighboring node can initiate that transmission. The node dynamically determines the lengths of active period 210 and sleep period 215, i.e., the schedule of the active and sleep periods does not have to be periodic. For example, a sleep period 218 is shorter than sleep period 215.

Figure 2B:
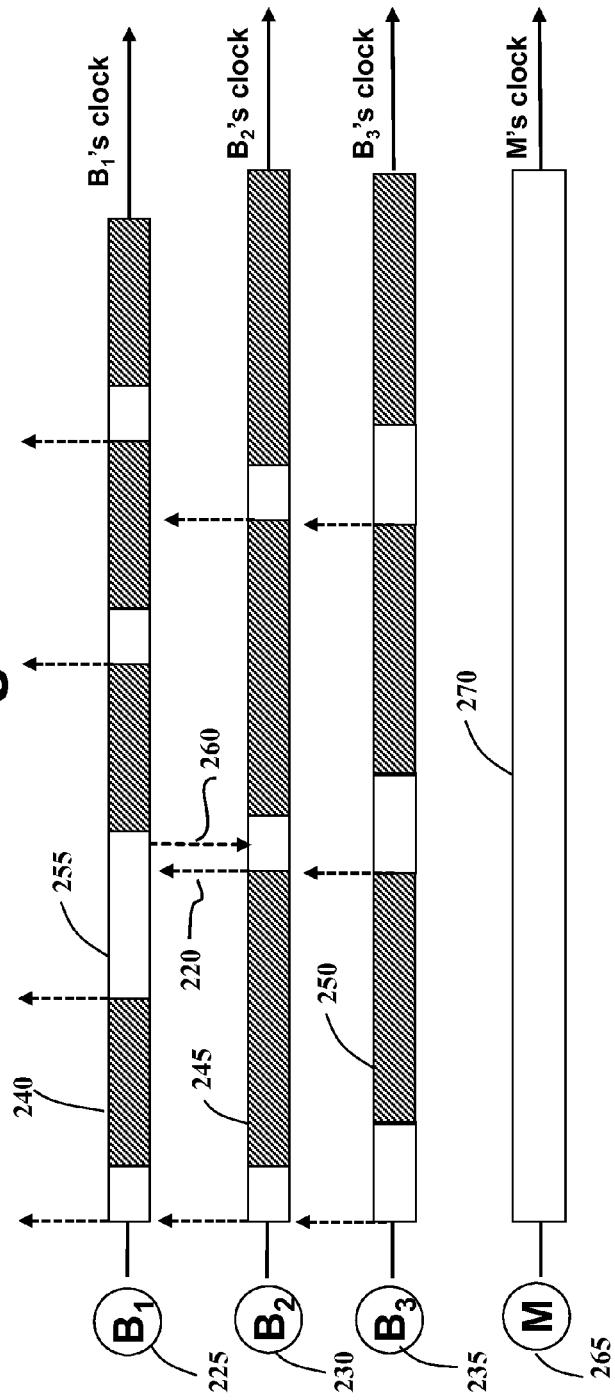
FIG. 2B shows schematic of a distributed sleep management model according to some embodiments of an invention.

FIG. 2B shows schematic of a distributed sleep management model according to some embodiments of an invention. Different nodes can have different active period and sleep period lengths, in which battery powered nodes $B_1$ 225, $B_2$ 230 and $B_3$ 235 have different length sleep periods 240, 245 and 250, respectively.

With the distributed sleep management model, if a battery powered node has no data to transmit, then the node schedules periodic sleep intervals. For example, nodes $B_2$ 230 and $B_3$ 235 have no data to transmit, and therefore, they perform periodic sleep scheduling. However, if a battery powered node has data to transmit to another battery powered node, as in one embodiment, then the sender node waits for a wakeup message 220 from the recipient battery powered node. In this case, the sender node prolongs its active period. For example, the node $B_1$ has data to send to a battery powered node $B_2$. Node $B_1$ extends its active period 255 and waits for a wakeup message from node $B_2$. Upon receiving wakeup message 220 from node $B_2$, node $B_1$ sends its data packet 260 to node $B_2$. After transmitting data, node $B_1$ performs the sleep scheduling.

In one embodiment, the BPN uses two timers, a sleep timer and a wakeup timer, to manage its sleep schedule. The sleep timer is used to schedule how long the node sleeps in a sleep interval and wakeup timer is used to schedule how long the node is awake in a sleep interval. A battery powered node determines its active period length and sleep period length dynamically. When the sleep timer expires, the battery powered node computes the active time value and starts the active timer. When active timer expires, the battery powered node computes the sleep time value and starts the sleep timer.

In some embodiments, the length of the sleep periods for the BPNs is limited and defined for a network. A battery powered node must set its sleep period length less than or equal to a maximal length. Similarly, a minimal active period length also can be defined for a network. A battery powered node must set its active period length greater than or equal to the minimal length.

With the distributed sleep management model, mains powered nodes are always active. For example, the MPN 265 has an infinite active period 270. A node can send data packet to a mains powered node at any time. In some embodiments, the MPNs do not transmit wakeup message. Therefore, in some embodiments, the routing algorithm determines the type of the data node.

Battery Energy Efficient Routing

Some embodiments are based on a realization that the battery efficient routing of the data packets from a particular data node to the sink node should be via the routing path consuming the least energy. For example, some embodiments transmit the data packets along a routing path reducing a number of battery-powered nodes transmitting or receiving data packets.

For wireless networks, conventional routing metrics can be classified into two categories, node state metrics, e.g., a hop count and a node energy level, and link metrics, e.g., link quality and expected transmission count (ETX). These conventional routing metrics only consider measurements between two nodes or status of the node itself. They do not utilize information along a routing path. As a result, those metrics work well for the homogeneous wireless networks without sleep nodes, but for the wireless networks with sleep nodes, those metrics can shorten the network lifetime.

Figure 3B:
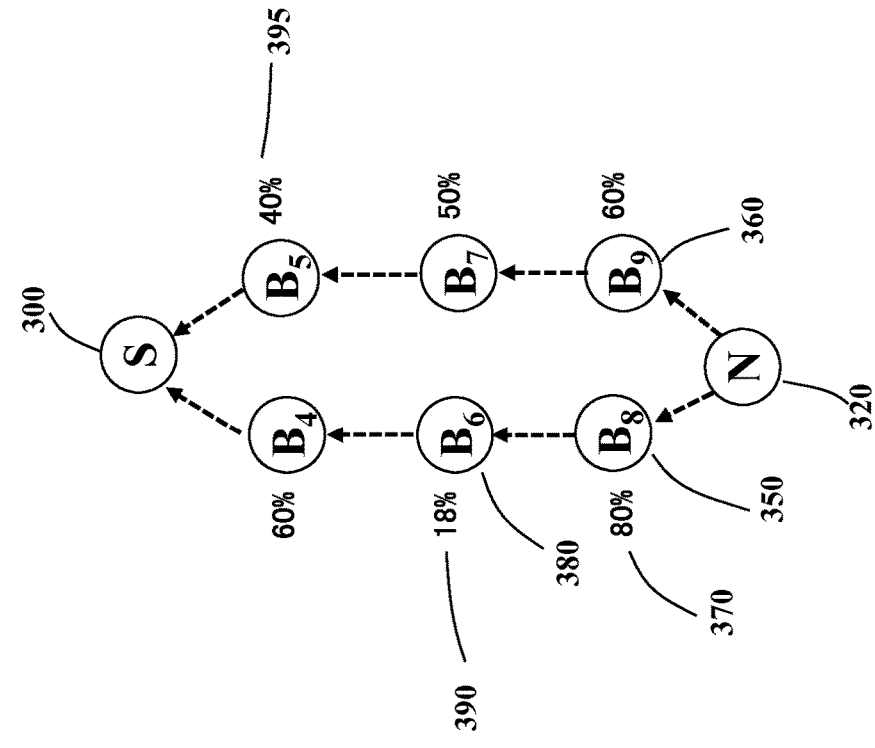
FIG. 3B depicts an example in which conventional routing algorithms shorten network lifetime by sending data packets to a node with higher battery level.
Figure 3A:
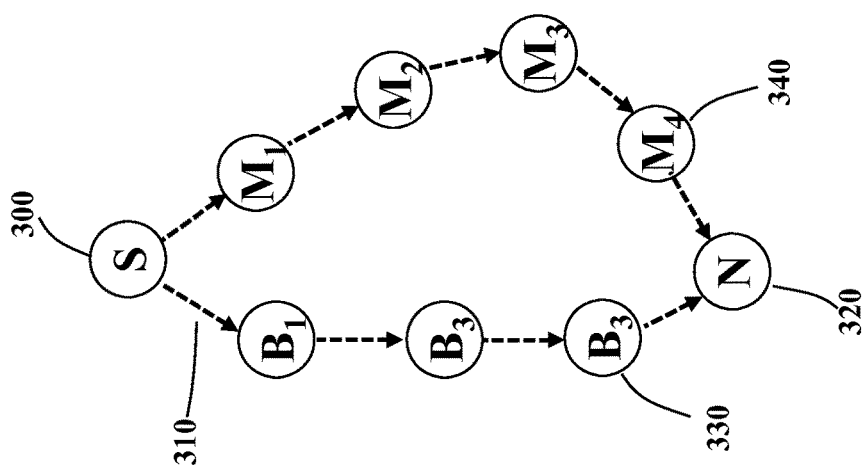
FIG. 3A depicts an example in which conventional routing algorithms shorten network lifetime by selecting a shorter path.

FIG. 3A shows an example in which $B_1$-$B_3$ are battery powered nodes and $M_1$-$M_4$ are mains powered nodes. Sink node S 300 initiates path discovery by broadcasting path discovery message 310. A node N 320 receives path discovery message from two neighbors $B_3$ 330 and $M_4$ 340. With the conventional routing metric, node N selects path via $B_3$ because path S→$B_1$→$B_2$→$B_3$ is shorter than path S→$M_1$→$M_2$→$M_3$→$M_4$. However, path S→$B_1$→$B_2$→$B_3$ is composed of all battery powered nodes. On the other hand, path S→$M_1$→$M_2$→$M_3$→$M_4$ is composed of all mains powered nodes. As a result, node N should select path via $M_4$. A path with more battery powered nodes consumes more battery energy, and also has higher delay due to sleep of the battery powered node.

FIG. 3B shows an example in which there is one sink node S 300, six battery powered nodes $B_4$-$B_9$ and one node N 310 (battery powered or mains powered). Node N discovered two paths to sink S, one path $B_8$→$B_6$→$B_4$→S and other path $B_9$→$B_7$→$B_5$→S. Node N has data packets to be sent to sink node S 300. Because node N cannot directly communicate with sink node S, node N must send its packets to either node $B_8$ 350 or $B_9$ 360. Since $B_8$ has higher energy level 80% 370, conventional routing metric allows N send its packet to $B_8$. However, the path via $B_8$ has lower battery powered node $B_6$ 380, which has battery level 18% 390. If node N sends its packets to sink S via $B_8$, then node $B_6$ will run out battery power more quickly since $B_6$ has to relay the packets sent by node N. Instead, node N should send its packets to $B_9$. The path via $B_9$ has the lowest battery level 40% 395, which is much higher than $B_6$'s battery level. However, with conventional routing metrics, node N 320 does not know $B_6$'s battery level.

Accordingly, one embodiment determines an energy saving metric to locate an energy efficient routing path. The energy saving metric can include one or combination of a power source (PS) metric identifying whether a data node is the BPN or the MPN, a battery-powered node count (BNC) metric storing a number of the BPNs along a routing path, a minimum battery level (MBL) metric storing a minimum level among the BPNs along the routing path, and a battery-powered overhearing count (BOC) metric storing a number of times that BPNs of the network overhear the data packets transmitted on the routing path.

Battery-powered node count (BNC) of a path counts number of battery powered nodes along a path. During routing path discovery, sink node sets BNC=0 when the sink is mains powered. Otherwise, sink sets BNC=1. A battery powered node increases BNC by 1 and a mains powered node does not change the value of BNC.

FIG. 4A shows an example, in which sink S 300 sets BNC=0, each of battery powered nodes $B_1$, $B_2$ and $B_3$ increases BNC by 1 and mains powered nodes $M_1$ and $M_2$ don't change BNC value. When routing path discovery message propagates to node N 310 (battery powered or mains powered), N knows there are 3 battery powered nodes along this path.

The Minimal Battery Level (MBL) of a path measures the minimal battery level among all battery powered nodes along a path. During routing path discovery, sink node sets MBL=100 when sink is mains powered. Otherwise, sink node sets MBL to its battery level. A battery powered node compares MBL contained in path discovery message with its own battery level. If its battery level is lower than MBL received, the node replaces MBL with its battery level. Otherwise, the node does not change the value of MBL. Mains powered nodes do not change the value of MBL.

FIG. 4B shows an example, in which sink S 300 sets MBL=100, battery powered node $B_1$ changes MBL=60, battery powered node $B_2$ changes MBL=50, battery powered node $B_3$ and mains powered nodes $M_1$ and $M_2$ do not change MBL value. When routing path discovery message propagates to node N 310 (battery powered or mains powered), node N knows that there is at least one battery powered node along this path that has 50% of battery level.

Battery-powered overhearing count (BOC) of a path counts the total number of times battery powered neighbors overhears packet transmission along the path. If a battery powered node is a neighbor of multiple nodes on the path, then this battery powered node is counted multiple times. In wireless network, when a transmitter sends a packet to a receiver, all active neighbors of the sender receive the packet even though the packet is not destined to these neighbors. Therefore, routing algorithm must minimize the probability of overhearing. BOC is a metric can be used to reduce battery energy consumption on overhearing. During routing path discovery, each node indicates if it is mains powered or battery powered. Sink node sets BOC to its number of battery-powered neighbors (NBN).

In one embodiment, at each hop, node N (mains powered or battery powered) on the path updates BOC as following:
1) If the node N is battery powered, it decreases BOC by 1 since previous hop node must count the node N as a battery powered neighbor.
2) If previous hop node is battery powered, node N decreases its NBN by 1 since previous hop node is node N's battery powered neighbor.
3) Node N adds its updated NBN to the updated BOC and includes BOC in path discovery message.

FIG. 4C shows an example, in which solid line 400 represents packet transmission and dash line 410 indicates packet overhearing by battery powered nodes. Node N 310 transmits packets to sink node S 300 (mains powered in the example) along a path $N \rightarrow M_2 \rightarrow B_3 \rightarrow M_1 \rightarrow B_2 \rightarrow B_1 \rightarrow S$. Even though battery powered nodes $B_4$-$B_9$ are not on the routing path, these nodes receive the packets when the nodes are awake. As a result, their batteries are consumed.

During routing path discovery, sink node S sets BOC=2 since node S has $B_1$ and $B_4$ as its battery powered neighbors. When $B_1$ receives path discovery message, it decreases BOC by 1, i.e., sets BOC=1. $B_1$ has three battery powered neighbors $B_2$, $B_4$ and $B_5$. Hence, $B_1$ updates BOC to 4. When $B_2$ receives path discovery message, the node decreases BOC by 1, i.e., BOC=3, $B_2$ also decreases its NBN by 1, and finally, $B_2$ sets BOC=BOC+1=4. Similarly, $M_1$, $B_3$ and $M_2$ update BOC. When routing path discovery message propagates to node N 310, node N sets BOC=10. In this example, the nodes $B_4$, $B_5$, $B_8$ and $B_9$ are counted twice.

In heterogeneous wireless networks with sleep nodes, the routing algorithm needs to refresh path level routing metrics frequently to reflect recent updates.

New Node State Routing Metric

A conventional node state metric energy level is defined for homogeneous network in which all nodes are battery powered. For heterogeneous network with both mains powered nodes and battery powered nodes, energy level metric does not indicate whether a node is mains powered or battery powered since at network startup all nodes have 100% of energy level. Therefore, a new node state metric called power source (PS) is used in some embodiments. For a node N, PS(N)=1 indicates node N is mains powered and PS(N)=0 indicates node N is battery powered.

RPL Overview

To design a scalable routing protocol for Low-power lossy networks (LLNs), the Internet Engineering Task Force (IETF) Routing Over Low power and Lossy networks (ROLL) working group (WG) has standardized Routing Protocol for Low-power and lossy networks (RPL) as RFC 6550. RPL organizes nodes in LLNs as a Directed Acyclic Graph (DAG) and partitions the DAG into one or more Destination Oriented DAGs (DODAGs). There is one DODAG per data sink.

To construct the topology of the DODAG and upward routes from nodes to a data sink, the data sink acts as the root of the DODAG and broadcasts DODAG Information Object (DIO) messages to neighboring nodes. DIO messages contain the information to construct the DODAG. For example, three parameters of RPLInstanceID, DODAGID and DODAGVersionNumber are enclosed to identify a DODAG version. The rank of a node defines the individual position of the node relative to other nodes with respect to the root of the DODAG. Nodes in the proximity of the data sink receive the DIO messages, determine their ranks when the nodes decide to join the DODAG, and transmit updated DIO messages to neighboring nodes. The ranks of the nodes are contained in the DIO messages. DIO messages are propagated in all directions so that the DODAG topology is constructed in a wave front manner, until every node joins a DODAG. RPL uses Destination Advertisement Object (DAO) messages to build downward routes from data sink to other destinations. The DAO messages are transmitted upwards from nodes to their parents or to the root. The DODAG Information Solicitation (DIS) message is used to solicit a DIO from a RPL node, that is, to discover new routes.

To achieve reliable routing, RPL allows a node to have multiple parents using the DODAG structure for determining the next hop for data packet forwarding. One of parents is selected as the preferred parent and others as backup parents. The preferred parent is used as default next hop for packet forwarding. If the preferred parent is unavailable, then the backup parents can be used. RPL uses Objective Functions (OF) for assisting nodes to determine ranks and select parents.

A routing algorithm uses control messages to discovery routing paths. For example, AODV uses route request (REQ) message and route reply (REP) message for route discovery. RPL uses DIO message for upward routing path discovery and uses DAO message for downward routing path discovery. Propagating routing path discovery message is challenge in the heterogeneous wireless networks consisting of sleep nodes. In the networks without sleep nodes, a node broadcasts a route discover message, all neighbors receive the broadcasted message. However, in the networks with the distributed sleep nodes, some neighbors sleep and some neighbor are awake. Sleep neighbor can't receive any message.

With the centralized sleep control, control node determines when a node sleeps and when it is active. However, with the distributed sleep model, such scheduled sleep and active information is not available. Only information available is that a sleep node transmits a wakeup message when it wakes up. For unicast packet, sender can wait until it receives the wakeup message from the receiver. But broadcast and multicast messages are different. They are destined to multiple receivers. The most of routing path discovery messages such as DIO in RPL are broadcast messages. For network connectivity, every node must receive such broadcast message. Otherwise, the node is isolated from the network. Therefore, for the important broadcast message, sender must guarantee to deliver the message to all neighbors.

Figure 5:
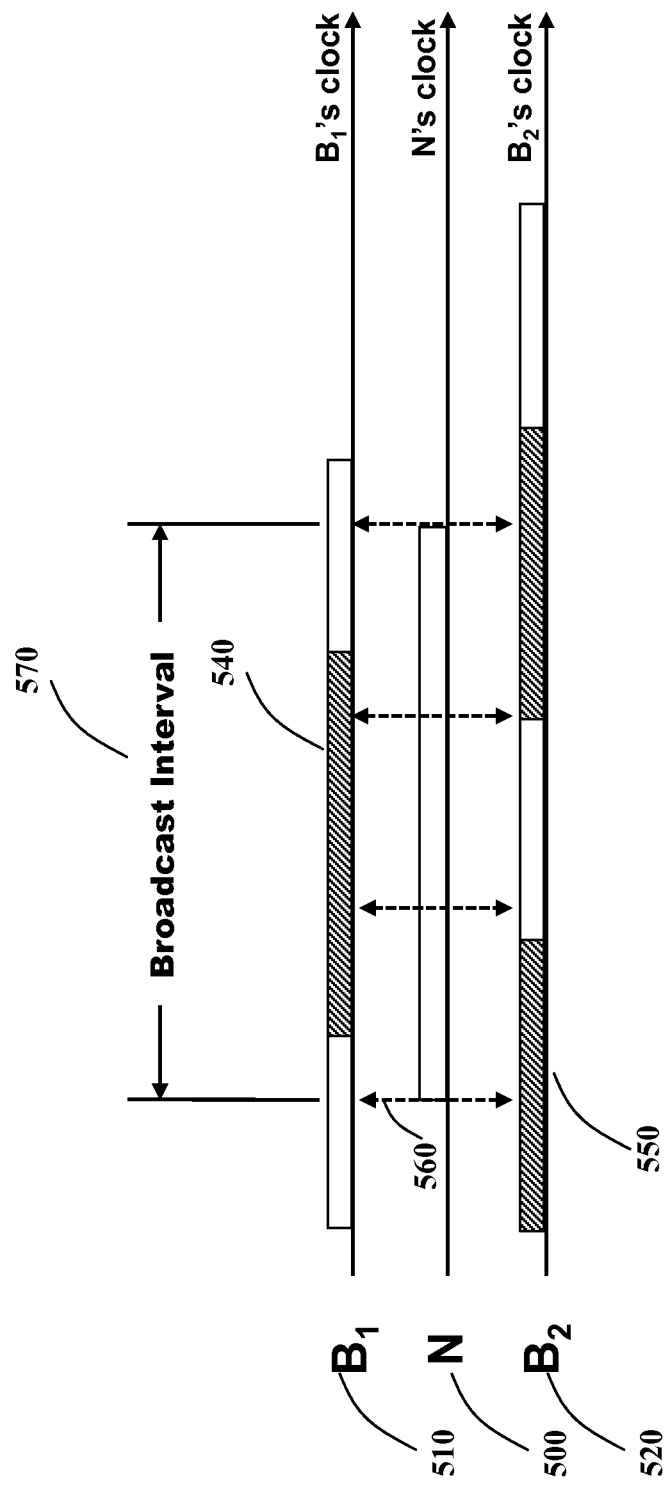
FIG. 5 depicts broadcast message transmission in wireless networks with distributed sleep management model according to some embodiments of an invention.

One method to deliver a broadcast message to all neighbors with the distributed sleep management model is to transmit the broadcast message for $$R_{TX} = \text{ceil}\left(\frac{MinActivePeriodLength + MaxSleepPeriodLength}{MinActivePeriodLength}\right) + 1 \quad (1)$$

times. These $R_{TX}$ transmissions are uniformly distributed over a time period called Broadcast interval. The length of broadcast interval is MinActivePeriodLength+MaxSleepPeriodLength. During these transmissions, the transmitting node may go to sleep after each retransmission and wakes up for next retransmission. Upon waking up, a transmission node may not send wakeup message. With $R_{TX}$ retransmissions, every neighbor is guaranteed to receive at least one copy of the broadcast message. For duplication detection, the transmitting node includes a sequence number in a broadcast message and all $R_{TX}$ retransmissions have same sequence number so that receiving nodes can determine if the broadcast message is duplicated. This broadcast message transmission method is more efficient when MinActivePeriodLength is relatively large so that $R_{TX}$ is relatively small. FIG. 5 shows an example, in which node N 500 (mains powered or battery powered) is the DIO transmission node and node $B_1$ 510 and $B_2$ 520 are two battery powered neighbors of node N. Node $B_1$ has a sleep period 540 longer than node $B_2$'s sleep period 550. In this example, MaxSleepPeriodLength=2*MinActivePeriodLength, therefore $R_{TX}$=4. Four DIO transmissions 560 are uniformly distributed over a broadcast interval 570. Node $B_1$ receives two copies of the DIO message and node $B_2$ receives one copy of the DIO message.

Another method to deliver a broadcast message to all neighbors with the distributed sleep management model is that transmission node stays awake for a broadcast interval. At the beginning of the broadcast interval, transmission node transmits the broadcast message once to make sure all mains powered neighbors receive the broadcast message. During the broadcast interval, the transmission node transmits the broadcast message once every time the node receives a wakeup message from a battery powered neighbor. With this method, transmission node transmits the broadcast message for NBN+1 times. Similarly, for duplication detection, transmission node includes a sequence number in the broadcast message and all retransmissions have same sequence number. This broadcast message transmission method is more efficient if transmission node has fewer battery powered neighbors.

Routing algorithm can adaptively use either method for different node by comparing $R_{TX}$ and NBN. $R_{TX}$ is same for all nodes in the network, but NBN is node dependent since different node may have different numbers of battery powered neighbors. A mains powered neighbor receives $R_{TX}$ or NBN+1 copies of the same broadcast message.

Routing Path Discovery in Heterogeneous Networks with Sleep Nodes

Figure 6:
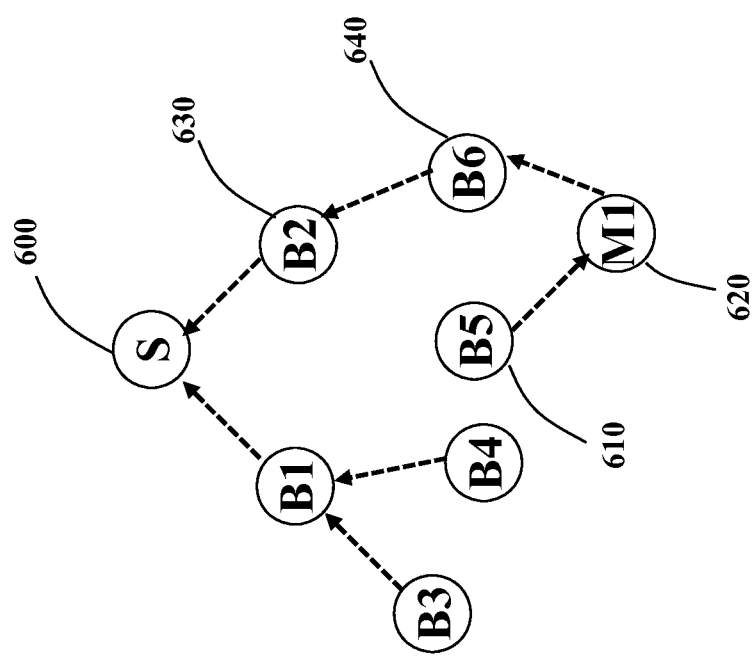
FIG. 6 shows an example in which selection of the mains powered node as next hop node to the sink actually consumes more battery power.

In a heterogeneous wireless network with both mains powered and battery powered, it is not always energy efficient to select mains powered node as next hop node. FIG. 6 is an example, in which sink node is S 600. Battery powered node $B_5$ 610 selects mains powered node $M_1$ 620 as next hop node since $M_1$ is a mains powered node. The selected path $B_5 \rightarrow M_1 \rightarrow B_6 \rightarrow B_2 \rightarrow S$ actually consumes more battery power since two battery powered nodes $B_2$ 630 and $B_6$ 640 are on the path. Instead, $B_5$ should select $B_2$ as its next hop node even $B_2$ is a battery powered node. Path $B_5 \rightarrow B_2 \rightarrow S$ is more energy efficient than path $B_5 \rightarrow M_1 \rightarrow B_6 \rightarrow B_2 \rightarrow S$.

Existing routing algorithms are not designed for heterogeneous networks with both mains powered and battery powered nodes, especially not for distributed sleep management model. New routing functions must be provided.

Take RPL for example, RPL doesn't support sleep nodes. To support sleep nodes, besides the conventional routing metrics defined by RPL, new metrics BNC, MBL, BOC and PS must be carried in DIO message. With these metrics, many ways can be used to as criteria to select parents and compute rank. The energy efficient methods are provided in following paragraphs. RPL uses DIO message propagation to discover upward routing paths. DIO message is originated by sink node. During DIO propagation, each node selects one default parent and multiple backup parents if these backup parents are available.

Figure 7:
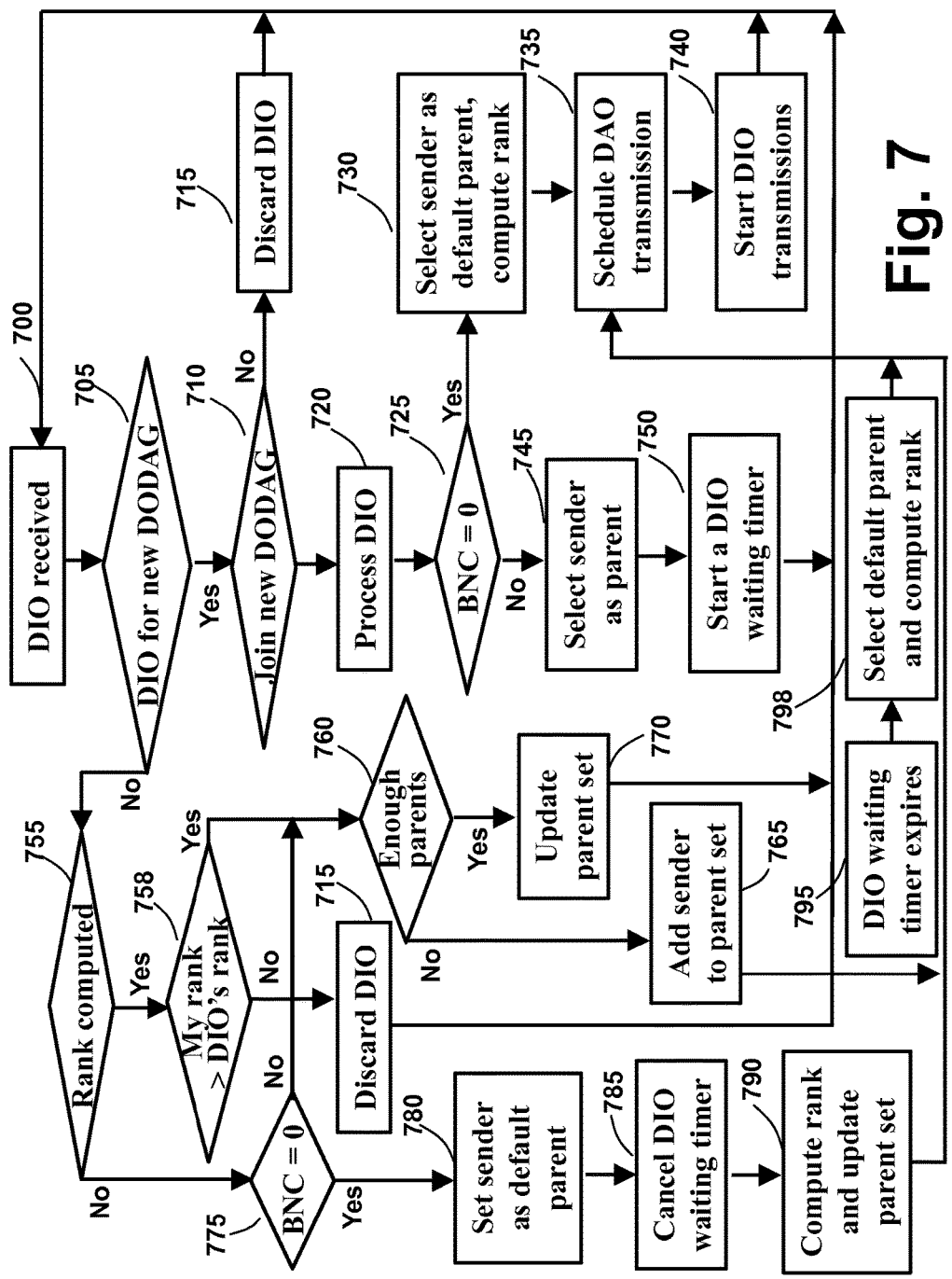
FIG. 7 shows block diagram of routing path discovery according to some embodiments of an invention.

FIG. 7 shows RPL with provided routing path discovery method supporting newly introduced battery power efficient routing metrics. When a node receives a DIO message 700, it checks 705 if this DIO is for a new DODAG or existing DODAG. If DIO is for a new DODAG, node decides 710 whether it joins this DODAG or not. If the node does not join new DODAG, the DIO message is discarded 715. If the node joins the DODAG, DIO is processed 720. If BNC is equal to zero 725, the node sets the DIO sender as its default parent 730, computes a rank for itself, schedules 735 a DAO transmission, and starts 740 to transmit DIO by using one of the broadcast message transmission methods provided above. If BNC is not zero, the node selects DIO sender 745 as a parent, but does not compute rank. Instead, the node starts 750 a timer to wait for more preferred DIOs. If the DIO is for an existing DODAG, the node has selected a parent already. So, it checks 755 if a rank is computed. If yes, it checks 758 if its rank is greater than the rank contained in DIO message. If no, DIO is discarded 715. If yes, it checks 760 if enough parents are selected, if no, the node adds 765 the DIO sender to its parent set, if yes, node updates 770 its parent set by replacing one of the parents if this DIO contains a better routing path. If rank is not computed and this DIO has 775 a BNC=0, node sets 780 the DIO sender as default parent, cancels 785 DIO waiting timers, compute 790 a rank and update parent set by replacing one of existing parents if enough parents are selected, schedules 735 a DAO transmission and starts 740 to broadcast DIO. If DIO has a BNC>0, the node adds DIO sender 760 to its parent set if no enough parents are selected or otherwise updates 770 its parent set if enough are parents selected. When timer expires 795, node selects 798 one parent from parent set as default parent and computes a rank, schedules 735 a DAO transmission and starts 740 DIO message transmissions.

To update the parent set, criteria need to be defined to determine one path is better than another path. There are different ways to define one path is better than other path. A path with smaller BNC is considered better than a path with large BNC if other metrics are similar. A path with greater MBL is considered better than a path with large smaller MBL if other metrics are similar. A path with smaller BOC is considered better than a path with large BOC if other metrics are similar. A path with the first hop node being mains powered is considered better than a path with the first hop node being battery powered if other metrics are similar.

Disclosed invention provides a method to determine a better path. For each parent candidate P, node calculates a parent qualification value Q(P) as follows $$Q(P) = \frac{BNC(P) * BOC(P)}{1 + MBL(P)}. \qquad (2)$$

A smaller Q(P) value indicates a better path. A node uses equation (2) to update its parent set. When DIO timer expires, node selects a parent with the least Q(P) value as default parent. In case of tie, node uses PS to break the tie. If PS cannot break the tie, the conventional routing metric defined by RPL is used to break the tie.

With conventional and new routing metrics, there are many ways to compute a rank for a node. Following is a rank computation method incorporates four new metrics into conventional rank computation:

$$R = R_D + R_I + C_{BNC}*BNC + C_{MBL}*MBL + C_{BOC}*BOC + C_{PS}*(1-PS(DP)), \qquad (3)$$

where $R_D$ is the rank of default parent (DP), $R_I$ is the rank increase computed by using conventional RPL routing metrics and object functions, $C_{BNC}$, $C_{MBL}$, $C_{BOC}$, and $C_{PS}$ are the coefficients to reflect the importance of BNC, MBL, BOC, and PS, respectively. These coefficients should be selected such that a node has a smaller rank if it discovers better default path. Otherwise, the node has a larger rank.

With the provided parent selection method, a node selects multiple parents. In other words, the node discovers multiple routing paths towards a sink node. The node advertises the best routing path discovered in its DIO message. For example, if a node discovered two routing paths to a sink node, one path with BNC=0 and other path with BNC=2, the node will advertise path with BNC=0.

Even though RPL is used as example to discover battery power efficient routing paths, the provided methods can be applied to any routing algorithms.

Idle Listening Time Reduction

Figure 8:
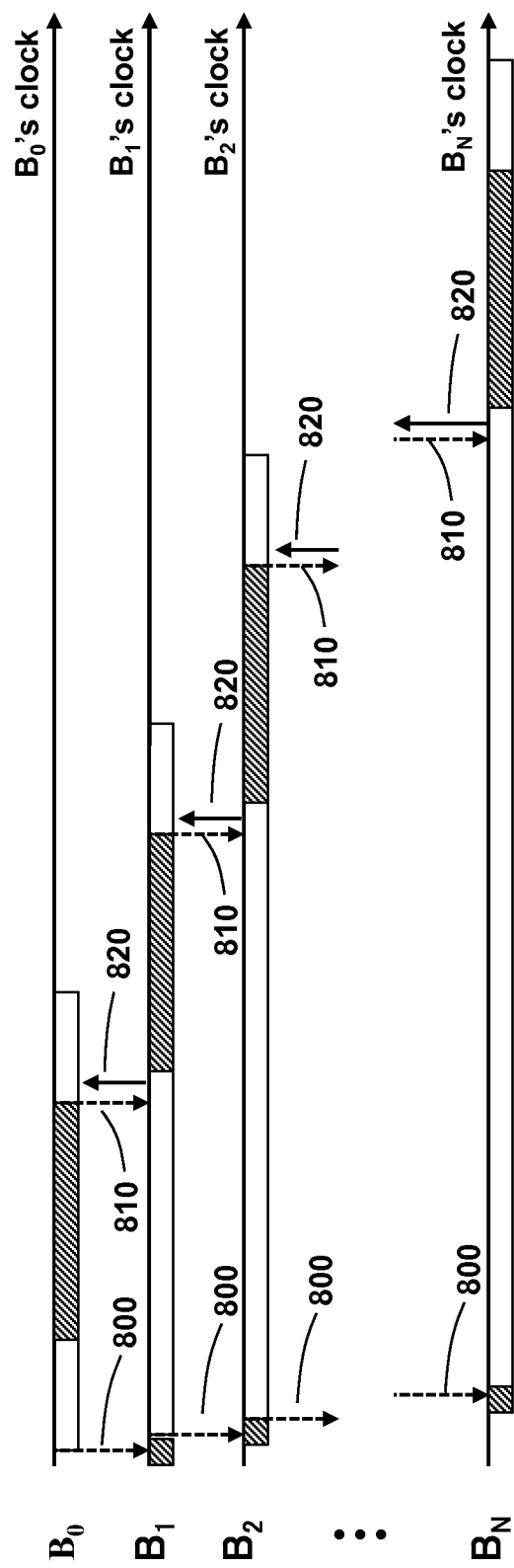
FIG. 8 illustrates that with the distributed sleep management model, multi-hop long delay is possible.

FIG. 8 shows an example, in which battery powered nodes $B_0, B_1, B_2, \ldots, B_N$ use same active period length and sleep period length. Node $B_1$ has data packet to be sent to node $B_0$, but $B_1$ just misses the first wakeup message 800 from $B_0$, $B_1$ waits for next wakeup message 810 from node $B_0$ and transmits packet 820 to $B_0$. Similarly, node $B_2$ has data packet to be sent to node $B_1$, but $B_2$ also just misses the first wakeup message 800 from $B_1$, so node $B_2$ waits for next wakeup message 810 from $B_1$ and transmits packet 820 to $B_1$, and so on. In this sequence, waiting time for $B_1 \approx$ ActivePeriodLength+SleepPeriodLength, waiting time for $B_1 \approx$ ActivePeriodLength+2*SleepPeriodLength, . . . , waiting time for $B_N \approx$ ActivePeriodLength+N*SleepPeriodLength. If active period length is 10 seconds and sleep period length is 90 seconds, node $B_5$ waits for approximately 460 seconds.

In some embodiments of the invention, the routing algorithm manages the schedule of the active and sleep periods of BPNs to also reduce idle listening time resulting in more energy consumption. To reduce idle listening time in distributed sleep model, in some embodiments the transmission node is not required to wait until a wakeup message from the receiver node is received. Different embodiments use one or combination of different methods to reduce idle listening time.

For example, the number of packets in the buffer is one parameter that can be used to reduce idle listening. If there are more packets in the buffer to be transmitted, then transmission node can wait for a longer timer. Otherwise, transmission node waits for a shorter time, and if no wakeup is received, the transmission node goes to sleep. Therefore, the idle listening time can be set to be proportional to the number of packets in the buffer.

Overhearing is another way to reduce idle listening time. Wireless medium is a shared medium. Any transmission overheard from receiving node indicates that receiving node is awake, and therefore transmission node can send packets to receiving node. For example, according to RPL protocol, a RPL node transmits DIO based on a trickle timer algorithm. It is pseudo periodic transmission. If transmission node overhears a DIO message from receiving node, then receiving node is awake. Also a node in the network needs to transmit its data to the sink.

The active notification is another method to reduce idle listening time. While a transmission node is waiting for wakeup message from its receiver, there might be other nodes that are waiting for the wakeup message from this transmission node. Therefore, if a transmission node is waiting for some time, it can dynamically send an active notification signal to let its neighbors know that it is awake so that neighbors can send their packets to it if they have such packets.

The battery level also needs to be considered in idle listening time management. Define a battery level threshold $BL_{TH}$. If a battery node's battery level is less than $BL_{TH}$, this battery node is in critical condition. Therefore, the battery node should set its active period to the minimum active period and sets its sleep period to the maximum sleep period. However, if a battery powered node has a battery level much higher than the MBL it collected, this battery powered node can set idle listening time longer.

Battery Energy Efficient Data Packet Transmission

With the sleep nodes, transmission of data packet is different from the case without sleep nodes, where the receiver is always awake, and the transmission node can send packets to the receiver at any timer. With sleep nodes, the transmitter must make sure that the receiver is awake in order to send packets. With conventional centralized sleep control, transmitter and receiver are scheduled so that they sleep and wake up simultaneously, that is, if the transmitter is awake, the receiver must be awake. Therefore, the transmitter can send packets to receiver as long as the receiver is awake. However, with the distributed sleep model, transmitter and receiver sleep and wake up independently, that is, when transmitter is awake, the receiver may be asleep. Therefore, routing algorithm must efficiently manage data packet transmission to avoid packet loss and save battery power.

In conventional RPL, a node always sends data packets to its default parent. However, with the distributed sleep model, a node cannot always send packets to its default parent since the default parent may be asleep. The node can wait for its default parent to wake up, but waiting consumes energy and also increases data delay. The efficient way is that a node can send data packets to any parent that is awake. If no parent is awake, the node may go to sleep or wait by using sleep management method described above.

For battery power efficiency, a transmission node must determine to which parent it should send packets if multiple parents are awake. To determine a preferred parent, the battery energy consumption along a path via each active parent must be estimated. A transmission node then selects a path via an active parent that consumes the least battery energy. The estimation of battery power consumption along a routing path is described in following paragraphs.

With the distributed sleep management model, the probability of a battery powered node B awake is $$P_a(B) = \frac{ActivePeriodLength(B)}{ActivePeriodLength(B) + SleepPeriodLength(B)}. \quad (4)$$

Assume power consumptions for transmitting and receiving a data packet are $P_t$ and $P_r$, respectively, power consumptions for transmitting and receiving wakeup message are $W_t$ and $W_r$, respectively. For a battery powered node B, $P_i(B)$ denotes battery power consumption on idle listening to wait for a wakeup message from a battery powered receiving node before packet transmission.

There are three steps to estimate battery power consumption along a path for a transmission node to deliver data packets to a sink node.

Step 1: Compute battery power consumed by transmitting a packet from a node to another node a) Battery power consumed by transmitting a packet from a battery powered node $B_t$ to a battery powered node $B_r$ is $$P(B_t, B_r) = \quad (5)$$
$$(P_i(B_t) + W_t + W_r + P_t + P_r) + \sum_{k=1}^{N_r} P_a(BB_r^k) * W_r + \sum_{j=1}^{N_t} P_a(BB_t^j) * P_r,$$

where $N_r$ is total number of battery neighbors of node $B_r$ without including node $B_t$, $BB_r^k$ (k=1 to $N_r$) are node $B_r$'s battery neighbors without including node $B_t$, $N_t$ is total number of battery neighbors of node $B_t$ without including node $B_r$ and $BB_t^j$ (j=1 to $N_t$) are node $B_t$'s battery neighbors without including node $B_r$.

b) Battery power consumed by transmitting a packet from a mains powered node $M_t$ to a battery powered node $B_r$ is $$P(M_t, B_r) = (W_t + P_r) + \sum_{k=1}^{N_r} P_a(BB_r^k) * W_r + \sum_{j=1}^{N_t} P_a(BM_t^j) * P_r, \quad (6)$$

where $N_r$ is total number of battery neighbors of node $B_r$, $BB_r^k$ (k=1 to $N_r$) are node $B_r$'s battery neighbors, $N_t$ is total number of battery neighbors of node $M_t$ without including node $B_r$ and $BM_t^j$ (j=1 to $N_t$) are node $M_t$'s battery neighbors without including node $B_r$.

c) Battery power consumed by transmitting a packet from a battery powered node $B_t$ to a mains powered node $M_r$ is $$P(B_t, M_r) = P_t + \sum_{j=1}^{N_t} P_a(BB_t^j) * P_r, \quad (7)$$

where $N_t$ is total number of battery neighbors of node $B_t$ and $BB_t^j$ (j=1 to $N_t$) are node $B_t$'s battery neighbors.

d) Battery power consumed by transmitting a packet from a mains powered node $M_t$ to a mains powered node $M_r$ is $$P(M_t, M_r) = \sum_{j=1}^{N_t} P_a(BM_t^j) * P_r, \quad (8)$$

where $N_t$ is total number of battery neighbors of node $M_t$ and $BM_t^j$ (j=1 to $N_t$) are node $M_t$'s battery neighbors.

Step 2: Compute battery power consumed by transmitting a packet from a source node to a sink node.

Along a path from source node N (mains powered or battery powered) to sink node S (mains powered or battery powered), assume there are B2B transmissions from battery powered node to battery powered node, M2B transmissions from mains powered node to battery powered node, B2M transmissions from battery powered node to mains powered node, and M2M transmissions from mains powered node to mains powered node. Using equations (5)-(8), the battery power consumed by transmitting a packet from a source node N to a sink node S is given by $$P(N, S) = \sum_{i=1}^{B2B} P(B_t^i, B_r^i) + \sum_{j=1}^{M2B} P(M_t^j, B_r^j) + \sum_{k=1}^{B2M} P(B_t^k, M_r^k) + \sum_{l=1}^{M2M} P(M_t^l, M_r^l). \quad (9)$$

Step 3: Compute the maximum value and the minimum value of P(N,S) along a path.

For a specific routing path from a source N to a sink node S, even though the number of battery powered nodes and number of mains powered nodes are fixed, the layout of these nodes affects the battery energy consumption. Including source node N and sink node S, assume there are NB battery powered nodes $B_1, B_2, \ldots, B_{NB}$ and NM mains powered nodes $M_1, M_2, \ldots, M_{NM}$ on the path. The maximum battery energy consumption occurs when all mains powered nodes are at the beginning of the path followed by all battery powered nodes, that is, $M_1 \rightarrow M_2 \rightarrow \ldots \rightarrow M_{NM} \rightarrow B_1 \rightarrow B_2 \rightarrow \ldots \rightarrow B_{NB}$. Therefore, $$\max(P(N, S)) = \sum_{j=1}^{NM-1} P(M_t^j, M_r^j) + P(M_t, B_r) + \sum_{i=1}^{NB-1} P(B_t^i, B_r^i). \quad (10)$$

The minimum battery energy consumption occurs when battery powered nodes and mains powered nodes are interleaved. If NM≥NB, the minimum battery power consumption layout is $B_1 \rightarrow M_1 \rightarrow B_2 \rightarrow M_2 \rightarrow \ldots \rightarrow B_{NB} \rightarrow M_{NB} \rightarrow M_{NB+1} \rightarrow \ldots \rightarrow M_{NM}$ and if NM<NB, the minimum battery power consumption layout is $B_1 \rightarrow M_1 \rightarrow B_2 \rightarrow M_2 \rightarrow \ldots \rightarrow B_{NM} \rightarrow M_{NM} \rightarrow B_{NM+1} \rightarrow \ldots \rightarrow B_{NB}$. Therefore, if NM≥NB $$\min(P(N, S)) = \sum_{i=1}^{NB} P(B_t^i, M_r^i) + \sum_{j=1}^{NB-1} P(M_t^j, B_r^j) + \sum_{k=1}^{NM-NB} P(M_t^k, M_r^k) \quad (11a)$$

and if NM < NB $$\min(P(N, S)) = \sum_{i=1}^{NM} P(B_t^i, M_r^i) + \sum_{j=1}^{NM} P(M_t^j, B_r^j) + \sum_{k=1}^{NB-NM-1} P(B_t^k, B_r^k). \quad (11b)$$

With the maximum and the minimum battery energy consumptions being computed, the average battery power consumption for a routing path from a source node N to a sink node S is given by $$\text{avg}(P(N, S)) = \frac{\max(P(N, S)) + \min(P(N, S))}{2}. \quad (12)$$

Therefore, if there are multiple parents active, a transmission node will forward its data packets to the parent with the minimum avg(P(N,S)). However, if MBL of a routing path reaches $BL_{TH}$, that path is not used unless there is no choice.

For a node N to actually compute avg(P(N,S)) along a path, it needs to know the number of battery powered neighbors for each node on the path and the number of mains powered nodes on the path as well as the probability of each battery powered neighbor is awake.

Hop count is used to calculate the number of mains powered nodes (NMN) along a path as follows.

$$\text{NMN} = \text{HopCount} - \text{BNC} + 1. \quad (13)$$

Therefore, total number of nodes on a path is NMN+BNC. On average, each node on the path has $$\text{avg}(BOC) = \frac{BOC}{NMN + BNC} \quad (14)$$

battery powered overhearing neighbors.

A typical active period length and a typical sleep period length can be used to estimate the probability of a battery powered neighbor is awake.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. The processor can be connected to memory, transceiver, and input/output interfaces as known in the art.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A network of nodes including data nodes and at least one sink node, wherein the network is a wireless multi-hop network in which packets are exchanged between the sink node and the data nodes in a multi-hop manner such that there is at least one data node exchanging the packets with the sink node through at least one intermediate data node relaying the packets between the data node and the sink node, the data nodes include battery-powered nodes (BPNs) having active and sleep periods and mains-powered nodes (MPNs) having only active periods, wherein each data node transmits the packets only within corresponding active periods, wherein the sink node initiates a routing path discovery by broadcasting control messages including Destination Oriented Directed Acyclic Graph (DODAG) Information Object (DIO) messages, Destination Advertisement Object (DAO) messages, and DODAG Information Solicitation (DIS) messages, wherein each of the data nodes determines and updates the DIO messages with energy saving metrics including a power source (PS) metric identifying whether a data node is the BPN or the MPN, a battery-powered node count (BNC) metric storing a number of the BPNs along a routing path, a minimum battery level (MBL) metric storing a minimum battery level among the BPNs along the routing path, and a battery-powered overhearing count (BOC) metric storing a number of times that BPNs of the network overhear data packets transmitted on the routing path, a BPN comprising:

a transceiver for transmitting and receiving data packets;
a processor for determining a schedule of active and sleep periods of the BPN independently from the active and sleep periods of other data nodes in the network and independently from commands transmitted by the sink node, wherein the processor switches the transceiver ON and OFF according to the schedule, wherein the processor of the BPN determines a set of parent nodes, each parent node starting a corresponding routing path to the sink node, and selects a default parent node having a minimum parent qualification value of $$P=(BNC*BOC)/(1+MBL); \text{ and}$$

a battery for providing energy to the transceiver and the processor.

2. The network of claim 1, wherein the processor of the BPN determines the schedule based on information internal to the BPN using activities of the network sensed by the BPN.

3. The network of claim 1, wherein the BPN further comprises:
a memory for buffering the data packets to be transmitted to the sink node, wherein the processor determines the schedule based on a number of the data packets in the memory.

4. The network of claim 1, wherein the BPN transmits a wakeup signal at the beginning of each active period.

5. The network of claim 1, wherein different BPNs have different schedules of active and sleep periods.

6. The network of claim 1, wherein the processor of the BPN determines a routing path from the BPN to the sink node reducing a number of the BPNs transmitting or overhearing the data packets transmitted on the path, and wherein the transceiver transmits the data packets to a parent node starting the routing path.

7. The network of claim 6, wherein the parent node is battery-powered, and wherein the BPN transmits the data packets to the parent node upon overhearing a wakeup signal or data packets transmitted by the parent node.

8. The network of claim 1, wherein the processor of the BPN determines probabilistically a set of active parent nodes, each parent node starting a corresponding routing path to the sink node, and selects from the set a default parent node having a minimum average battery energy consumption value avg(P(N,S)) determined according to $$\text{avg}(P(N,S))=[\max(P(N,S))+\min(P(N,S))]/2$$

wherein N is source node, S is sink node, max(P(N,S)) is a maximum battery energy consumption estimation among layouts of BPNs and MPNs along a routing path from a node N to a node S, and min(P(N,S)) is a minimum battery energy consumption estimation among layouts of BPNs and MPNs along the routing path from the node N to the node S.

9. The network of claim 6, wherein the BPN transmits the data packets over the routing path if a minimum battery level among the BPNs along the routing path is greater than a threshold.

10. The network of claim 3, wherein the processors determines an idle listening time of the BPN proportional to the number of packets in the memory.

11. A battery-powered node (BPN) for forming a heterogeneous wireless multi-hop network of nodes including data nodes and at least one sink node, wherein the sink node initiates a routing path discovery by broadcasting control messages including Destination Oriented Directed Acyclic Graph (DODAG) Information Object (DIO) messages, Destination Advertisement Object (DAO) messages, and DODAG Information Solicitation (DIS) messages, wherein each of the data nodes determines and updates the DIO messages with energy saving metrics including a power source (PS) metric identifying whether a data node is the BPN or mains-powered node (MPN), a battery-powered node count (BNC) metric storing a number of the BPNs along a routing path, a minimum battery level (MBL) metric storing a minimum battery level among the BPNs along the routing path, and a battery-powered overhearing count (BOC) metric storing a number of times that BPNs of the network overhear data packets transmitted on the routing path, wherein the data nodes include battery-powered nodes (BPNs) and mains-powered nodes (MPNs), comprising:
a transceiver for transmitting and receiving data packets;
a processor for determining a schedule of active and sleep periods of the BPN independently from the active and sleep periods of other data nodes in the network and independently from commands transmitted by the sink node, wherein the processor switches the transceiver ON and OFF according to the schedule, wherein the processor of the BPN determines probabilistically a set of active parent nodes, each parent node starting a corresponding routing path to the sink node, and selects from the set a default parent node having a minimum average battery energy consumption value avg(P(N,S)) determined according to $$\text{avg}(P(N,S))=[\max(P(N,S))+\min(P(N,S))]/2$$

wherein N is data node, S is sink node, max(P(N,S)) is a maximum batter energy consumption estimation among layouts of BPNs and MPNs along a routing path from a node N to a node S, and min(P(N,S)) is a minimum batter energy consumption estimation among layouts of BPNs and MPNs along the routing path from the node N to the node S; and
a battery for providing energy to the transceiver and the processor.

12. The BPN of claim 11, wherein the processor determines the schedule based on information internal to the BPN using activities of the network observed by the BPN.

13. The BPN of claim 11, further comprising:
a memory for buffering the data packets, wherein the processor determines the schedule based on a number of the data packets in the memory.

14. The BPN of claim 11, wherein the BPN transmits a wakeup signal at the beginning of each active period.

15. The BPN of claim 11, wherein the BPN determines a routing path from the BPN to the sink node reducing a number of the BPNs transmitting or overhearing the data packets transmitted on the routing path, and wherein the transceiver transmits the data packets to a parent node starting the routing path.

16. The BPN of claim 15, wherein the BPN determines the parent node using energy saving metric including a power source (PS) metric identifying whether a data node is the BPN or the MPN, a battery-powered node count (BNC) metric storing a number of the BPNs along a routing path, a minimum battery level (MBL) metric storing a minimum battery level among the BPNs along the routing path, and a battery-powered overhearing count (BOC) metric storing a number of times that BPNs of the network overhear the data packets transmitted on the routing path.

* * * * *